US011591925B2

(12) United States Patent
Nagano et al.

(10) Patent No.: US 11,591,925 B2
(45) Date of Patent: Feb. 28, 2023

(54) MONITORING DEVICE, METHOD FOR MONITORING TARGET DEVICE, AND PROGRAM

(71) Applicant: Mitsubishi Hitachi Power Systems, Ltd., Kanagawa (JP)

(72) Inventors: Ichiro Nagano, Yokohama (JP); Kuniaki Aoyama, Tokyo (JP); Mayumi Saito, Tokyo (JP); Shintaro Kumano, Tokyo (JP); Katsuhiko Abe, Yokohama (JP); Toru Tanaka, Yokohama (JP); Takahiro Yamauchi, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1063 days.

(21) Appl. No.: 16/301,549

(22) PCT Filed: May 31, 2017

(86) PCT No.: PCT/JP2017/020252
§ 371 (c)(1),
(2) Date: Nov. 14, 2018

(87) PCT Pub. No.: WO2017/209179
PCT Pub. Date: Dec. 7, 2017

(65) Prior Publication Data
US 2019/0264573 A1 Aug. 29, 2019

(30) Foreign Application Priority Data
Jun. 1, 2016 (JP) .............................. JP2016-110337

(51) Int. Cl.
F01D 17/08 (2006.01)
G01M 15/14 (2006.01)
(Continued)

(52) U.S. Cl.
CPC ........... F01D 17/085 (2013.01); F01D 25/00 (2013.01); F02C 7/00 (2013.01); G01M 15/14 (2013.01);
(Continued)

(58) Field of Classification Search
None
See application file for complete search history.

(56) References Cited

U.S. PATENT DOCUMENTS 8,744,813 B2 * 6/2014 Lacaille ............. G05B 23/0254
703/2
2001/0034582 A1 10/2001 Umezawa et al.
(Continued)

FOREIGN PATENT DOCUMENTS

JP 2000-259222 9/2000
JP 2001-263006 9/2001
(Continued)

OTHER PUBLICATIONS

Machine Translation of JP2011106467A (Year: 2011).*
(Continued)

Primary Examiner — Matthew G Marini
(74) Attorney, Agent, or Firm — Wenderoth, Lind & Ponack, L.L.P.

(57) ABSTRACT

An acquisition unit is configured to acquire measurement values of a target device. The measurement values that are acquired include at least a temperature and a flow rate of an input fluid to be input to the target device, and a temperature and a flow rate of an output fluid to be output from the target device. A correction unit is configured to obtain a correction measurement value by which the measurement values are corrected through thermal equilibrium calculations based on the measurement values. A distance calculation unit is
(Continued)

configured to calculate a Mahalanobis distance with a factor of the correction measurement value.

8 Claims, 9 Drawing Sheets

(51) Int. Cl.
    *G05B 23/02*     (2006.01)
    *F01D 25/00*     (2006.01)
    *F02C 7/00*     (2006.01)

(52) U.S. Cl.
    CPC .......... *G05B 23/02* (2013.01); *F05D 2220/32* (2013.01); *F05D 2260/80* (2013.01); *F05D 2270/303* (2013.01); *F05D 2270/3061* (2013.01); *F05D 2270/311* (2013.01); *F05D 2270/312* (2013.01); *F05D 2270/313* (2013.01)

(56) References Cited

U.S. PATENT DOCUMENTS

| | | | |
|---|---|---|---|
| 2010/0198555 | A1 | 8/2010 | Takahama et al. |
| 2015/0293531 | A1* | 10/2015 | Mikami ............. G05B 23/0235 702/182 |
| 2017/0211900 | A1 | 7/2017 | Kubo et al. |

FOREIGN PATENT DOCUMENTS

| | | |
|---|---|---|
| JP | 2005-293169 | 10/2005 |
| JP | 2010-181188 | 8/2010 |
| JP | 2011-090382 | 5/2011 |
| JP | 2011-106467 | 6/2011 |
| JP | 2011106467 A * | 6/2011 |
| JP | 5031088 | 9/2012 |
| JP | 5101396 | 12/2012 |
| JP | 2016-006594 | 1/2016 |
| WO | 2016/063772 | 4/2016 |

OTHER PUBLICATIONS

John W. Tierney and John L. Yanosik, Simultaneous Flow and Temperature Correction in the Equilibrium Stage Problem, AIChE Journal, Nov. 1969 (Year: 1969).*

International Search Report dated Aug. 15, 2017 in International (PCT) Application No. PCT/JP2017/020252 with English translation.

Written Opinion of the International Searching Authority dated Aug. 15, 2017 in International (PCT) Application No. PCT/JP2017/020252 with English translation.

* cited by examiner

MONITORING DEVICE, METHOD FOR MONITORING TARGET DEVICE, AND PROGRAM

TECHNICAL FIELD

The present invention relates to a monitoring device configured to monitor a target device, a method for monitoring the target device, and a program.

This application claims priority based on Japanese Patent Application No. 2016-110337 filed in Japan on Jun. 1, 2016, of which the contents are incorporated herein by reference.

BACKGROUND ART

As a system for monitoring an operation state of a plant, there has been known a system using a Mahalanobis distance (for example, see Patent Document 1). The system described in Patent Document 1 performs a series of processing from monitoring of a sign of a failure to a failure diagnosis in the plant based on the Mahalanobis distance.

CITATION LIST

Patent Document

Patent Document 1: JP 2011-90382 A

SUMMARY OF INVENTION

Problem to be Solved by the Invention

In order to obtain a Mahalanobis distance and a unit space to be used for calculating the Mahalanobis distance, state quantities collected from a target device being a device constructing a plant is required. As the state quantities, values of control signals for controlling the target device and measurement values output by sensors provided to the target device are exemplified.

However, the measurement values output by the sensors provided to the target device include a measurement error. Therefore, the Mahalanobis distance calculated by using the measurement values may be influenced by the error.

An object of the present invention is to provide a target device, a method for monitoring the target device, and a program, which are capable of calculating a Mahalanobis distance while suppressing an influence of an error included in measurement values.

Solution to Problem

According to a first mode of the present invention, a monitoring device includes an acquisition unit, a correction unit, and a distance calculation unit. The acquisition unit is configured to acquire measurement values being measurement values of a target device. The measurement values include at least a temperature and a flow rate of an input fluid to be input to the target device and a temperature and a flow rate of an output fluid to be output from the target device. The correction unit is configured to obtain a correction measurement value by which the measurement values are corrected through thermal equilibrium calculations based on the measurement values. The distance calculation unit is configured to calculate a Mahalanobis distance with a factor of the correction measurement value.

According to a second mode of the present invention, in the monitoring device of the first mode, the distance calculation unit may calculate the Mahalanobis distance with the factors of the measurement values and the correction measurement value.

According to a third mode of the present invention, the monitoring device of the first mode or the second mode may further include an atmospheric condition acquisition unit and a normalization unit. The atmospheric condition acquisition unit is configured to acquire an atmospheric condition including at least one of an atmospheric pressure, an atmospheric temperature, and an atmospheric humidity. The normalization unit is configured to normalize the measurement values to values or the correction measurement value to a value under a normal atmospheric condition by using the atmospheric condition that is acquired. The distance calculation unit may calculate the Mahalanobis distance based on the measurement values that are normalized or the correction measurement value that is normalized.

According to a fourth mode of the present invention, the monitoring device of any one mode of the first mode to the third mode may include a likelihood calculation unit, a table storage unit, and an estimation unit. The likelihood calculation unit is configured to calculate an occurrence likelihood for each of a plurality of phenomena that are liable to occur to the target device based on the measurement values or the correction measurement value when the Mahalanobis distance is equal to or greater than a predetermined value. The table storage unit is configured to store a table in which the plurality of phenomena and occurrence causes of abnormalities of the target device are associated to each other. The estimation unit is configured to estimate the occurrence causes based on the occurrence likelihood and the table.

According to a fifth mode of the present invention, the monitoring device of any one mode of the first mode to the fourth mode may include a linearity determination unit. The linearity determination unit is configured to determine whether a measurement value indicating a temperature among the measurement values acquired by the acquisition unit falls within a range from a minimum value to a maximum value of a measurement value indicating a temperature, which forms a unit space of the Mahalanobis distance. The distance calculation unit may be prevented from calculating the Mahalanobis distance based on the measurement values when the linearity determination unit determined that the measurement value is out of the range from the minimum value to the maximum value of the measurement value indicating the temperature in the unit space.

According to a sixth mode of the present invention, in the monitoring device of any one mode of the first mode to the fifth mode, the acquisition unit may acquire the measurement values at a time point after a start-up, which is a time point after elapse of a predetermined start-up period starting from an operation start time point of the target device. The distance calculation unit may calculate the Mahalanobis distance based on the measurement values acquired by the acquisition unit with the unit space formed by using measurement values at a time point during the predetermined start-up period.

According to a seventh mode of the present invention, a monitoring device includes an acquisition unit and a distance calculation unit. The acquisition unit is configured to acquire measurement values of the target device at a time point after a start-up, which is a time point after elapse of a predetermined start-up period from an operation start time point of the target device. The distance calculation unit is configured to calculate a Mahalanobis distance based on the measurement values acquired by the acquisition unit with a unit space formed by using measurement values at a time point during the predetermined start-up period.

According to an eighth mode of the present invention, in the monitoring device of the sixth mode or the seventh mode, the predetermined start-up period may be a period starting from an operation start time point of the target device in a new article state. The time point after the start-up may be a time point during a predetermined period starting from an operation start time point of the target device after completion of regular inspection.

According to a ninth mode of the present invention, in the monitoring device of the sixth mode or the seventh mode, the predetermined start-up period may be a period starting from the latest time point of the operation start time point in a new article state and the operation start time point after the completion of the regular inspection.

According to a tenth mode of the present invention, a method for monitoring a target device includes the following steps. Specifically, measurement values being measurement values of a target device are acquired. The measurement values include at least a temperature and a flow rate of an input fluid to be input to the target device and a temperature and a flow rate of an output fluid to be output from the target device. A correction measurement value by which the measurement values are corrected is obtained through thermal equilibrium calculations based on the measurement values. Then, a Mahalanobis distance is calculated with a factor of the correction measurement value.

According to an eleventh mode of the present invention, in the method for monitoring a target device, the Mahalanobis distance may be calculated with the factors of the measurement values and the correction measurement value.

According to a twelfth mode of the present invention, the method for monitoring a target device of the tenth mode or the eleventh mode may further include the following steps. Specifically, an atmospheric condition including at least one of an atmospheric pressure and an atmospheric humidity is acquired. Under a normal atmospheric condition by using the atmospheric condition that is acquired, the measurement values are normalized to values, or the correction measurement value is normalized to a value. The Mahalanobis distance may be calculated based on the measurement values that are normalized or the correction measurement value that is normalized.

According to a thirteenth mode of the present invention, a method for monitoring a target device includes the following steps. Specifically, measurement values of the target device are acquired at a time point after a start-up, which is a time point after elapse of a predetermined start-up period from an operation start time point of the target device. A Mahalanobis distance is calculated based on the measurement values that are acquired with a unit space formed by using measurement values at a time point during the predetermined start-up period.

According to a fourteenth mode of the present invention, a program causes a computer to execute the following processing. Specifically, measurement values being measurement values of a target device are acquired. The measurement values include at least a temperature and a flow rate of an input fluid to be input to the target device, and a temperature and a flow rate of an output fluid to be output from the target device. A correction measurement value by which the measurement values are corrected is obtained through thermal equilibrium calculations based on the measurement values. Then, Mahalanobis distance is calculated with a factor of the correction measurement value.

Advantageous Effect of Invention

According to at least one mode of the above-mentioned modes, the monitoring device performs the thermal equilibrium calculations and the correction for the measurement values, thereby being capable of suppressing an error included in the measurement values. With this, the monitoring device can calculate the Mahalanobis distance while suppressing the influence of the error included in the measurement values.

DESCRIPTION OF EMBODIMENTS

First Embodiment

Now, with reference to the drawings, detailed description is given of a first embodiment of the present invention.

A monitoring device 100 according to the first embodiment is configured to monitor presence or absence of abnormality in a gas turbine T and identify an occurrence cause of the abnormality. The gas turbine T is an example of a target device.

Target Device

Figure 1:
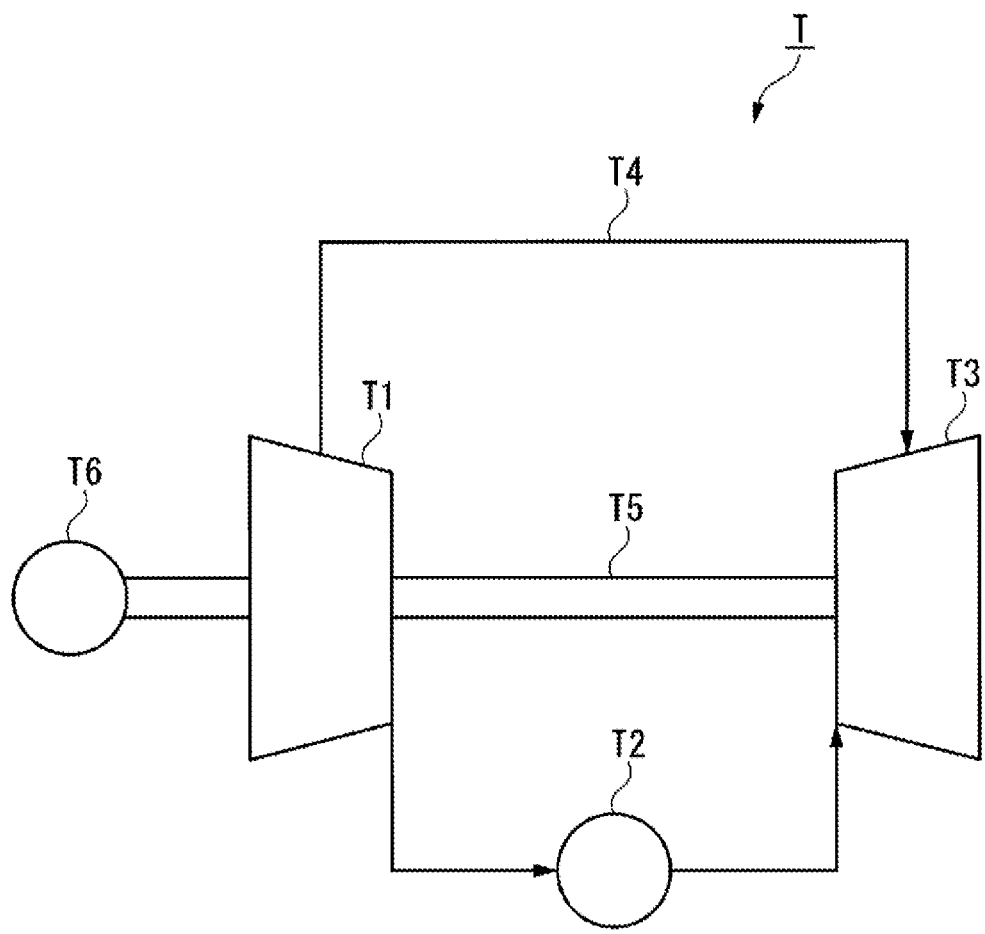
FIG. 1 is a schematic diagram of a gas turbine being an example of a target device.

FIG. 1 is a schematic diagram of the gas turbine being an example of the target device.

The gas turbine T includes a compressor T1, a combustor T2, a turbine T3, a rotor T5, an extraction pipe T4, and a generator T6. The compressor T1, the turbine T3, and the generator T6 are joined to the rotor T5, and are rotated about an axis of the rotor T5. The compressor T1 is rotated to take in air through an air inlet port, and compresses the intake air to generate compressed air. The combustor T2 sprays fuel to the compressed air generated by the compressor T1 to generate a combustion gas having a high temperature and a high pressure. Further, cooling steam is blown against the combustor T2 to cool the combustor T2.

The turbine T3 converts a thermal energy of the combustion gas generated by the combustor T2 into a rotation energy for the rotor T5 to generate a driving force. The extraction pipe T4 has one end connected to the compressor T1 and the other end connected to the turbine T3. The extraction pipe T4 extracts part of the compressed air generated by the compressor T1 and supplies the compressed air that is extracted (cooling air) to the turbine T3 to cool the turbine T3. The generator T6 converts the rotation energy for the rotor T5 into an electric energy.

A plurality of sensors (not illustrated) are mounted to the gas turbine T. As sensor values acquired by the respective sensors, there are exemplified an atmospheric pressure, an atmospheric temperature, an atmospheric relative humidity, an inlet pressure difference of the compressor T1, an outlet air temperature of the compressor T1, an outlet air pressure of the compressor T1, a fuel pressure, a fuel temperature, a fuel heating value, a fuel composition, a fuel flow rate, a cooling steam pressure, a cooling steam temperature, a cooling steam flow rate, a cooling air temperature, a cooling air flow rate, an exhaust air temperature, a sucked air pressure loss, an exhaust air pressure loss, power generation efficiency of the generator T6, generated electric power, a power generation current, a power generation voltage, and a power generation frequency.

Configuration

Figure 2:
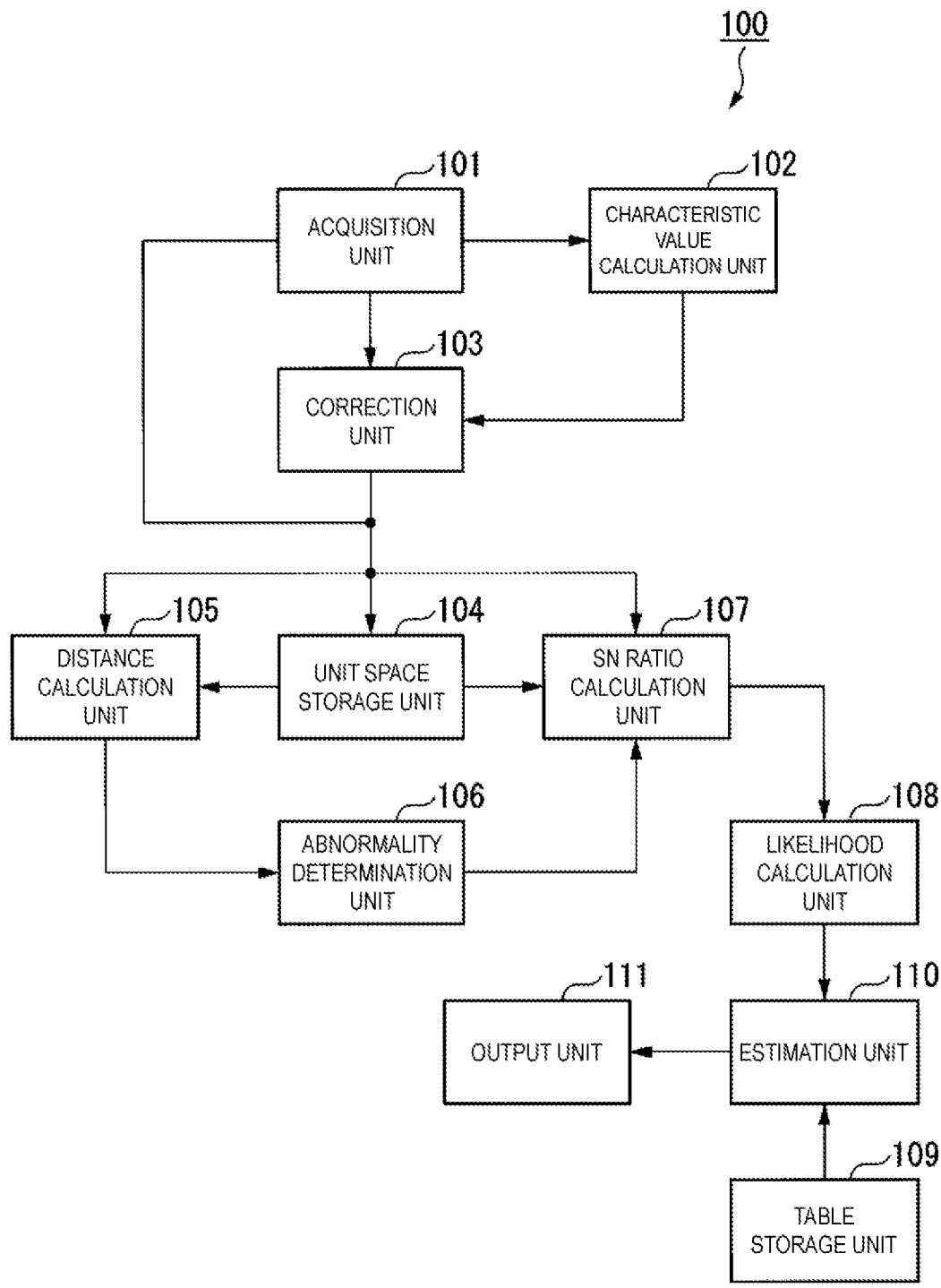
FIG. 2 is a schematic block diagram for illustrating the configuration of a monitoring device according to a first embodiment of the present invention.

Description is given of the configuration of the monitoring device 100. FIG. 2 is a schematic block diagram for illustrating the configuration of the monitoring device according to the first embodiment.

The monitoring device 100 includes an acquisition unit 101, a characteristic value calculation unit 102, a correction unit 103, a unit space storage unit 104, a distance calculation unit 105, an abnormality determination unit 106, an SN ratio calculation unit 107, a likelihood calculation unit 108, a table storage unit 109, an estimation unit 110, and an output unit 111.

The acquisition unit 101 acquires the sensor values acquired by the sensors provided to the gas turbine T and values (command values) of control signals of the gas turbine T. Note that, as described above, the sensor values acquired by the acquisition unit 101 include at least temperatures of air and fuel that are input to the gas turbine T (input fluid) and a temperature of exhaust air that is output from the gas turbine T (output fluid). The sensor values are examples of the measurement values of the gas turbine T.

The characteristic value calculation unit 102 calculates characteristic values for showing characteristics of the gas turbine T based on the sensor values acquired by the acquisition unit 101. As the characteristic values, there are exemplified thermal efficiency, compressor efficiency, combustion efficiency, turbine efficiency, compressor motive power, turbine output, a gas turbine air flow rate, a gas turbine exhaust air flow rate, a compressor pressure ratio, and an inlet combustion gas temperature of the turbine T3. For example, the characteristic value calculation unit 102 calculates the compressor efficiency (characteristic value) by subtracting a difference between an actual compressor outlet enthalpy and an actual compressor inlet enthalpy from a difference between a compressor outlet enthalpy and an inlet compressor inlet enthalpy in a case of an isentropic change. Each enthalpy is calculated by using a temperature and a pressure being the sensor values. The characteristic values are examples of the measurement values of the gas turbine T. Note that, as described above, the characteristic values calculated by the characteristic value calculation unit 102 include at least an air flow rate input to the gas turbine T and an exhaust air flow rate output from the gas turbine T.

The correction unit 103 corrects the sensor values acquired by the acquisition unit 101 and the characteristic values calculated by the characteristic value calculation unit 102 based on thermal equilibrium calculations for the gas turbine T, and then obtains a correction measurement value.

Specifically, the correction unit 103 corrects the measurement values in the following procedure. First, the correction unit 103 substitutes the measurement values to the thermal equilibrium calculations for the gas turbine T, and calculates errors of the respective measurement values, which satisfy the thermal equilibrium calculations. Then, the correction unit 103 obtains a total of the errors calculated for the respective measurement values or a total of the squares of the values, and obtains the correction measurement value by selecting a combination of the errors for the respective measurement values so as to obtain the smallest total.

Specifically, the thermal equilibrium of the gas turbine T as a whole is expressed by Expression (1) below. The thermal equilibrium of the compressor T1 is expressed by Expression (2) below. The thermal equilibrium of the combustor T2 is expressed by Expression (3) below. The thermal equilibrium of the turbine T3 is expressed by Expression (4) below. In each of Expression (1) to Expression (4), the left hand side expresses heat input, and the right hand side expresses heat output.

[Math. 1]
$$G1 \times H1C + Gf \times Hf + Gf \times LHV \times \mu_{BURN} + Gst \times Hst1 = \frac{\frac{KWGEN}{4.1868}}{\mu_{GEN}} + G8 \times H2T + Gst \times Hst2 \quad (1)$$

[Math. 2]
$$G1 \times H1C + \frac{KWC}{4.1868} = G2 \times H2C + Gc \times Hc \quad (2)$$

[Math. 3]
$$G2 \times H2C + Gf \times Hf + Gf \times LHV \times \mu_{BURN} + Gst \times Hst1 + Gw \times Hw = Gst \times Hst2 + G4 \times H1T \quad (3)$$

[Math. 4]
$$G4 \times H1T + Gc \times Hc = G8 \times H2T + \frac{KWT}{4.1868} \quad (4)$$

A variable G1 expresses an intake flow rate. A variable H1C expresses an intake enthalpy. A variable G2 expresses an outlet flow rate of the compressor T1. A variable H2C expresses an outlet enthalpy of the compressor T1. A variable Gf expresses a fuel flow rate. A variable LHV expresses a fuel heating value. A variable Gst expresses a cooling steam flow rate. A variable Hst1 expresses an enthalpy of the cooling steam supplied to the combustor T2. A variable Hst2 expresses an enthalpy of the cooling steam discharged from the combustor T2. A variable Gc expresses a cooling air amount. A variable Hc expresses a cooling air enthalpy. A variable G4 expresses an inlet flow rate of the turbine T3. A variable H1T expresses an inlet enthalpy of the turbine T3. A variable G8 expresses an exhaust air flow rate. A variable H2T expresses an exhaust air enthalpy. A variable $\mu_{gen}$ expresses power generation efficiency. A variable μbum expresses combustion efficiency. A variable KWGEN expresses generated electric power. A variable KWC expresses a compressor motive power. A variable KWT expresses turbine output.

The unit space storage unit 104 stores the combination of the state quantities of the gas turbine T (the measurement values, the correction measurement value, and the command values) as a unit space of a Mahalanobis distance. The state quantities are acquired during a start-up period of the gas turbine T (for example, a period of two weeks from the latest time point of an operation start time point of a gas turbine T in a new article state and an operation start time point of a gas turbine T after completion of regular inspection).

The distance calculation unit 105 calculates a Mahalanobis distance indicating a state of the gas turbine T based on the unit space stored by the unit space storage unit 104 with the factors of the sensor values and the command values acquired by the acquisition unit 101, the characteristic values calculated by the characteristic value calculation unit 102, and the correction measurement value by which the correction unit 103 performs the correction. The Mahalanobis distance is a scale indicating a degree of a difference between a reference sample expressed as a unit space and a newly obtained sample. A method for calculating the Mahalanobis distance is described later.

The abnormality determination unit 106 determines whether abnormality occurs to the gas turbine T based on the Mahalanobis distance calculated by the distance calculation unit 105. Specifically, the abnormality determination unit 106 determines that abnormality occurs to the gas turbine T when the Mahalanobis distance is equal to or greater than a predetermined threshold value (for example, 3.5). Generally, a value equal to or greater than three is set as the threshold value.

When the abnormality determination unit 106 determines that abnormality occurs to the gas turbine T, the SN ratio calculation unit 107 calculates a signal-noise ratio (SN ratio) in the Taguchi method based on the sensor values and the command values acquired by the acquisition unit 101, the characteristic values calculated by the characteristic value calculation unit 102, and the correction measurement amount by which the correction unit 103 performs correction. That is, the likelihood calculation unit 108 obtains the SN ratio based on presence or absence of an item by an orthogonal table analysis. As the SN ratio is larger, it can be determined that abnormality is more liable to occur to the item of the state quantity (the measurement value or the command value).

Based on the SN ratio calculated by the SN ratio calculation unit 107, the likelihood calculation unit 108 calculates an occurrence likelihood for each of a plurality of phenomena (performance degradation) that may occur to the gas turbine T. As the phenomena, for example, there are exemplified reduction in gas turbine output, reduction in gas turbine efficiency, reduction compressor efficiency, reduction in turbine efficiency, reduction in compressor inlet air amount, increase in exhaust air temperature, reduction compressor compression ratio, reduction in combustion efficiency, increase in turbine inlet gas temperature, and increase in exhaust gas pressure. For example, the likelihood calculation unit 108 stores, for each phenomenon, a relationship between presence or absence of occurrence of the phenomenon and the state quantity that is dominantly involved in increase or decrease of the SN ratio, and calculates a weighted sum of the SN ratio of the state quantity associated with each phenomenon. In this manner, the likelihood calculation unit 108 calculates an occurrence likelihood for each phenomenon.

The table storage unit 109 stores a table showing a relationship between the phenomena and occurrence causes of abnormalities.

Specifically, for each phenomenon and each occurrence cause, the table storage unit 109 stores the number of times at which the phenomena are observed when the abnormality occurs due to the occurrence cause. For example, assuming that a state in which a deviation of a blade path temperature was large (phenomenon) was observed nine times in the past when abnormality due to damage of an exhaust air diffuser (occurrence cause) occurred, the table storage unit 109 associates the occurrence cause of "damage of the exhaust air diffuser" and the phenomenon of "state in which the deviation of the blade path temperature is large" with each other, and stores the number of times, which is nine. The table stored by the table storage unit 109 can be formed based on, for example, data of a fault tree analysis (FTA) formed by a maintenance worker at the time of operation of the gas turbine T.

The estimation unit 110 estimates an occurrence cause of abnormality of the gas turbine T based on the occurrence likelihood of each phenomenon calculated by the likelihood calculation unit 108 and the table stored by the table storage unit 109.

Specifically, the estimation unit 110 multiplies vectors in one row and M columns having the occurrence likelihoods of the respective phenomena as elements and a matrix in M rows and N columns having the values of the table as elements. In this manner, the estimation unit 110 obtains vectors in N rows and one column having the likelihoods of the occurrence causes of the abnormalities as elements. M expresses the number of phenomena, and N expresses the number of occurrence causes. Further, the estimation unit 110 can estimate that the occurrence cause in the row having the large element value among the obtained vectors in the N rows and the one column is the occurrence cause of the abnormality of the gas turbine T.

The output unit 111 outputs the occurrence causes estimated by the estimation unit 110 in an order of the likelihoods. As outputs, for example, there are exemplified displaying on a display screen, transmission of the data to the outside, printing on a sheet, and voice output.

Mahalanobis Distance

Here, description is given of a calculation expression for calculating a general Mahalanobis distance D.

The number of items of the plurality of state quantities (measurement values and command values) indicating the state of the gas turbine T is expressed by a value of "u".

The value of "u" is an integer equal to or greater than two. The state quantities of the "u" items are expressed by $X_1$ to $X_u$, respectively. In a reference operation state of the gas turbine T (in the first embodiment, the operation state for two weeks from the latest time point of the operation start time point of the gas turbine T in a new article state and the operation start time point of the gas turbine T after the completion of the regular inspection), the monitoring device 100 collects "v (equal to or greater than two)" values for each of the state quantities $X_1$ to $X_u$ of the items. For example, when sixty values are acquired for each of the state quantities of the items, v=60 is satisfied. The j state quantities $X_1$ to $X_u$ for each item collected in the operation state are expressed by $X_{1j}$ to $X_{uj}$, respectively. The value of "j" is any value (integer) from one to the value of "v", and indicates that there are "v" values for each state quantity. That is, the monitoring device 100 collects the state quantities $X_{11}$ to $X_{uv}$. The state quantities $X_{11}$ to $X_{uv}$ are stored in the unit space storage unit 104.

The monitoring device 100 obtains an average value $M_i$ and a standard deviation $\sigma_i$ (degree of non-uniformity of the reference data) of the state quantities $X_{11}$ to $X_{uv}$ for each item with Expression (5) and Expression (6). The number of items (the number of state quantities, integer) is expressed by the value i. Here, the value i is set to one to the value of "u", and expresses a value corresponding to the state quantities $X_1$ to $X_u$. Here, the standard deviation is a positive square root of an expected value of a square of a difference between the state quantity and the average value.

[Math. 5]

$$M_i = \frac{1}{v}\sum_{j=1}^{v} X_{ij} \quad (5)$$

[Math. 6]

$$\sigma_i = \sqrt{\frac{1}{v-1}\sum_{j=1}^{v}(X_{ij} - M_i)^2} \quad (6)$$

The average value $M_i$ and the standard deviation $\sigma_i$ are the state quantities indicating characteristics. The monitoring device 100 converts the state quantities $X_{11}$ to $X_{uv}$ into normalized state quantities $x_{11}$ to $x_{uv}$ with Expression (7) below by using the average value $M_i$ and the standard deviation $\sigma_i$ that are computed. That is, an abnormality monitoring device 10 converts the state quantity $X_{ij}$ of the gas turbine T into a random variable $x_{ij}$ given an average of zero and a standard deviation of one. Note that, in Expression (7) below, the value j is any value (integer) from one to the value of "v". That is, the value of "v" is the number of state quantities for each item.

[Math. 7]

$$x_{ij} = \frac{X_{ij} - M_i}{\sigma_i} \quad (7)$$

In order to perform an analysis with the data in which variates are normalized to be given the average of zero and the variance of one, the monitoring device 100 specifies a correlation of the state quantities $X_{11}$ to $X_{uv}$. That is, the monitoring device 100 defines a covariance matrix (correlation matrix) R indicating a relationship between the variances and an inverse matrix $R^{-1}$ of the covariance matrix (correlation matrix) in Expression (8) below. Note that, in Expression (8) below, a value of "k" is the number of items (the number of state quantities). That is, the value of "k" and the value of "u" are equal to each other. Further, the value of "i" and a value of "p" are values for each state quantity, and are values from one to the value of "u" here.

[Math. 8]

$$R = \begin{pmatrix} 1 & r_{12} & \cdots & r_{1k} \\ r_{21} & 1 & \cdots & r_{2k} \\ \vdots & \vdots & \ddots & \vdots \\ r_{k1} & r_{k2} & \cdots & 1 \end{pmatrix} \quad (8)$$

$$R^{-1} = \begin{pmatrix} a_{11} & a_{12} & \cdots & a_{1k} \\ a_{21} & a_{22} & \cdots & a_{2k} \\ \vdots & \vdots & \ddots & \vdots \\ a_{k1} & a_{k2} & \cdots & a_{kk} \end{pmatrix} = \begin{pmatrix} 1 & r_{12} & \cdots & r_{1k} \\ r_{21} & 1 & \cdots & r_{2k} \\ \vdots & \vdots & \ddots & \vdots \\ r_{k1} & r_{k2} & \cdots & 1 \end{pmatrix}$$

$$r_{ip} = r_{pi} = \frac{1}{v}\sum_{j=1}^{v} X_{ij}X_{pj}$$

After the computing processing as described above, the monitoring device 100 obtains the Mahalanobis distance D being the state quantity indicating a characteristic based on Expression (9) below. Note that, in Expression (9), the value of "j" is any value (integer) from one to the value of "v". That is, the value of "v" is the number of state quantities for each item. Further, the value of "k" is the number of items (the number of state quantities). That is, the value of "k" and the value of "u" are equal to each other. Further, values of "$a_{11}$" to "$a_{kk}$" are coefficients of the inverse matrix $R^{-1}$ of the covariance matrix shown in Expression (8) described above.

[Math. 9]

$$D_j^2 = \frac{1}{k}(x_{1j}, x_{2j}, \ldots, x_{kj}) \cdot \begin{pmatrix} a_{11} & a_{12} & \cdots & a_{1k} \\ a_{21} & a_{22} & \cdots & a_{2k} \\ \vdots & \vdots & \ddots & \vdots \\ a_{k1} & a_{k2} & \cdots & a_{kk} \end{pmatrix} \cdot \begin{pmatrix} x_{1j} \\ x_{2j} \\ \vdots \\ x_{kj} \end{pmatrix} \quad (9)$$

$$= \frac{1}{k}\sum_{i=1}^{k}\sum_{p=1}^{k} a_{jp} x_{ij} x_{pj}$$

$$= \frac{1}{k}(x_{1j}, x_{2j}, \ldots, x_{kj}) \cdot R^{-1} \cdot \begin{pmatrix} x_{1j} \\ x_{2j} \\ \vdots \\ x_{kj} \end{pmatrix}$$

The Mahalanobis distance D is the reference data. The average value of the Mahalanobis distance D of the unit space is one. In a state in which the state quantity of the gas turbine T is normal, the Mahalanobis distance D stays equal to or approximately less than three. However, in a state in which the state quantity of the gas turbine T is abnormal, the value of the Mahalanobis distance D is approximately greater than three. As described above, the Mahalanobis distance D has a property that the value becomes larger in accordance with a degree of abnormality of the state quantity of the gas turbine T (degree of separation from the unit space).

Method for Monitoring Gas Turbine

Figure 3:
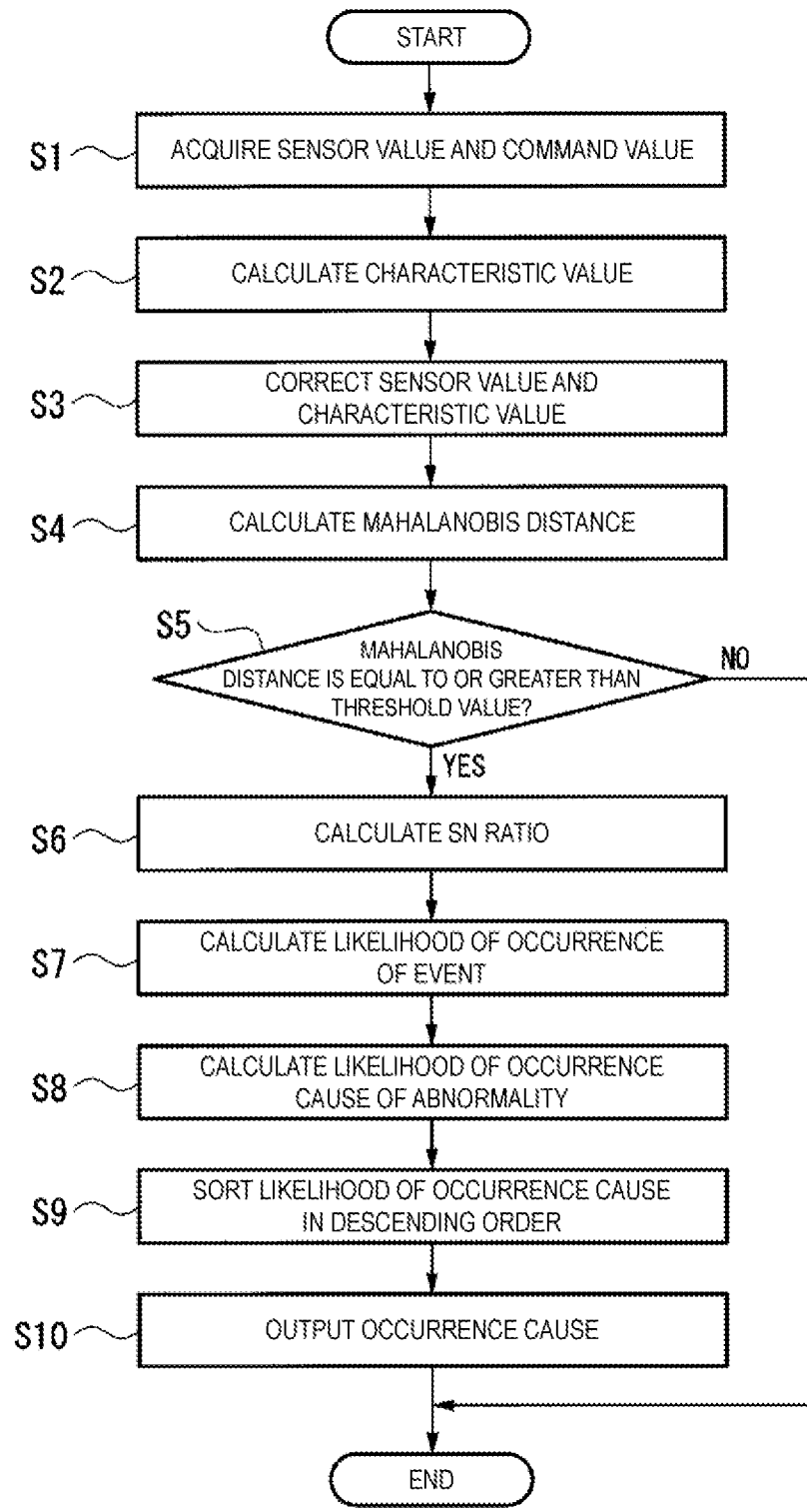
FIG. 3 is a flowchart for illustrating operations of the monitoring device according to the first embodiment.

Next, description is given of a method for monitoring the gas turbine, which is performed by the monitoring device 100. FIG. 3 is a flowchart for illustrating the operations of the monitoring device according to the first embodiment.

During the start-up period of the gas turbine T, the monitoring device 100 collects the state quantities of the gas turbine T, and causes the unit space storage unit 104 to store the combinations of the state quantities. That is, the monitoring device 100 associates the command values of the gas turbine acquired by the acquisition unit 101 and the correction measurement value formed by the correction unit 103, and records the values in the unit space storage unit 104. After the elapse of the start-up period of the gas turbine T, the monitoring device 100 performs monitoring operations as described below at a predetermined monitoring timing (for example, every hour). The monitoring timing is an example of a certain time point after the start-up, which is the time point after the elapse of the predetermined start-up period from the operation start time point of the gas turbine T.

When the monitoring device 100 starts monitoring, the acquisition unit 101 acquires the sensor values acquired by the sensors provided to the gas turbine T and the command values of the gas turbine T (Step S1).

Subsequently, the characteristic value calculation unit 102 calculates the characteristic values of the gas turbine T based on the sensor values acquired by the acquisition unit 101 (Step S2). Subsequently, the correction unit 103 corrects the sensor values and the characteristic values based on the thermal equilibrium calculations of the gas turbine T, and obtains the correction measurement value (Step S3).

Subsequently, the distance calculation unit 105 calculates the Mahalanobis distance based on the unit space stored by the unit space storage unit 104 with the factors of the sensor values and the command values acquired in Step S1, the characteristic values calculated in Step S2, and the correction measurement value obtained in Step S3 (Step S4). Subsequently, the abnormality determination unit 106 determines whether the calculated Mahalanobis distance is equal to or greater than the predetermined threshold value (Step S5).

When the Mahalanobis distance is smaller than the threshold value (NO in Step S5), the abnormality determination unit 106 determines that abnormality does not occur to the gas turbine T. The monitoring device terminates the monitoring processing, and waits for the next monitoring timing.

In contrast, when the Mahalanobis distance is equal to or greater than the threshold value (YES in Step S5), the abnormality determination unit 106 determines that abnormality occurs to the gas turbine T.

When the abnormality determination unit 106 determines that the abnormality occurs to the gas turbine T, the SN ratio calculation unit 107 calculates the SN ratio in the Taguchi method for each of the command values acquired in Step S1 and the correction measurement value obtained in Step S3 (Step S6). The likelihood calculation unit 108 calculates the occurrence likelihood for each of the plurality of phenomena that may occur to the gas turbine T based on the calculated SN ratio (Step S7).

Subsequently, the estimation unit 110 multiplies the vectors having the occurrence likelihoods of the respective phenomena, which are calculated by the likelihood calculation unit 108, as elements and the matrix having the values of the table stored by the table storage unit 109 as elements. In this manner, the estimation unit 110 obtains the vectors having the likelihoods of the occurrence causes of the abnormalities as elements (Step S8). Subsequently, the estimation unit 110 sorts the occurrence causes in the descending order of the likelihoods indicated by the obtained vectors (Step S9). Then, the output unit 111 outputs the information indicating the occurrence causes estimated by the estimation unit 110 in the sorted order (Step S10). For example, the output unit 111 outputs a signal for displaying the occurrence cause having the highest likelihood on a display screen. When a display command for the next occurrence cause is received through control by a user, the output unit 111 outputs a signal for displaying the occurrence cause having the second-highest likelihood on the display screen. Further, for example, the output unit 111 outputs a signal for printing a list of the occurrence in the descending order of the likelihoods on a sheet.

Operational Effects

As described above, according to the first embodiment, the measurement values including the temperatures and the flow rates of the air and the fuel that are input to the gas turbine T and the temperature and the flow rate of the exhaust air that is output from the gas turbine T are corrected by the thermal equilibrium calculations. In this manner, the monitoring device 100 calculates the Mahalanobis direction.

With this, the monitoring device 100 can calculate the Mahalanobis distance while suppressing measurement errors of the sensors provided to the gas turbine T.

Further, according to the first embodiment, the monitoring device 100 calculates the Mahalanobis distance with the factors of the measurement values acquired at the time point after the start-up, which is the time point after the elapse of the predetermined start-up period from the operation start time point of the gas turbine T, and with the unit space of the measurement values acquired during the start-up period. That is, the monitoring device 100 calculates the Mahalanobis distance with the unit space in the normal operation state of the gas turbine T itself being a subject to be monitored. In the related art, as the unit space of the Mahalanobis distance, the Mahalanobis distance is calculated based on the unit spaces in an operation state in which degradation occurs but abnormality does not occur after the elapse of the start-up period and in other operation states of the gas turbine T. Meanwhile, according to the first embodiment, the Mahalanobis distance is calculated based on the unit space only in the operation state of the gas turbine T itself being the subject to be monitored before occurrence of degradation. With this, the monitoring device 100 can perform the abnormality detection for the gas turbine T being the subject to be monitored with high accuracy.

Further, the start-up period in the first embodiment is a period which starts from the latest time point of the operation start time point in a new article condition and the operation start time point after the completion of the regular inspection. That is, whenever the regular inspection is performed, the unit space of the Mahalanobis distance is updated. In this manner, with the normal operation state after the regular inspection for the gas turbine T (the operation state in a new article state at first) as a reference, the abnormality detection for the gas turbine T can be performed. In a case of the space unit in a new article state, that is, the operation state of the gas turbine without degradation, the Mahalanobis distance is relatively large even when the operation state of the gas turbine T after the regular inspection is the normal state. This is because degradation caused by use of the gas turbine T is difficult to be completely removed through the regular inspection. Therefore, with the normal operation state of the gas turbine T after the regular inspection as a reference, the abnormality detection for the gas turbine T is performed. Accordingly, the operation state can be determined with high accuracy.

Further, according to the first embodiment, the monitoring device 100 calculates the occurrence likelihood for each of the plurality of phenomena that may occur to the gas turbine T, and estimates the occurrence cause of the abnormality based on the likelihood and the table for showing the relationship between the phenomena and the occurrence causes of the abnormalities. In this manner, the monitoring device 100 can output the occurrence cause of the abnormality based on the observed phenomenon. Note that, the configurations in the other embodiments are not limited thereto. The monitoring device 100 according to the other embodiments may not estimate the occurrence cause of the abnormality, and may only output that the abnormality occurs. Further, the monitoring device 100 according to the other embodiments may not output the occurrence cause of the abnormality of the phenomenon, and may inform a user of the SN ratio of the state quantity or the phenomenon which is highly probable to have occurred.

Further, according to the first embodiment, the monitoring device 100 calculates the Mahalanobis distance with the factors of the measurement values, the correction measurement value, and the command values. With this, even when the balance between the heat input and the heat output collapses due to, for example, the degradation of the gas turbine T, the state of the gas turbine T can suitably be evaluated. Note that, the configurations in the other embodiments are not limited thereto. For example, the monitoring device 100 according to the other embodiments may calculate the Mahalanobis distance with the factor of the correction measurement value and without the factors of the measurement values. Further, the monitoring device 100 according to the other embodiments may calculate the Mahalanobis distance without the factors of the command values.

Second Embodiment

Now, with reference to the drawings, detailed description is given of a second embodiment of the present invention.

The monitoring device 100 according to the second embodiment is configured to monitor a degradation state of the gas turbine T after the regular inspection.

Configuration

Figure 4:
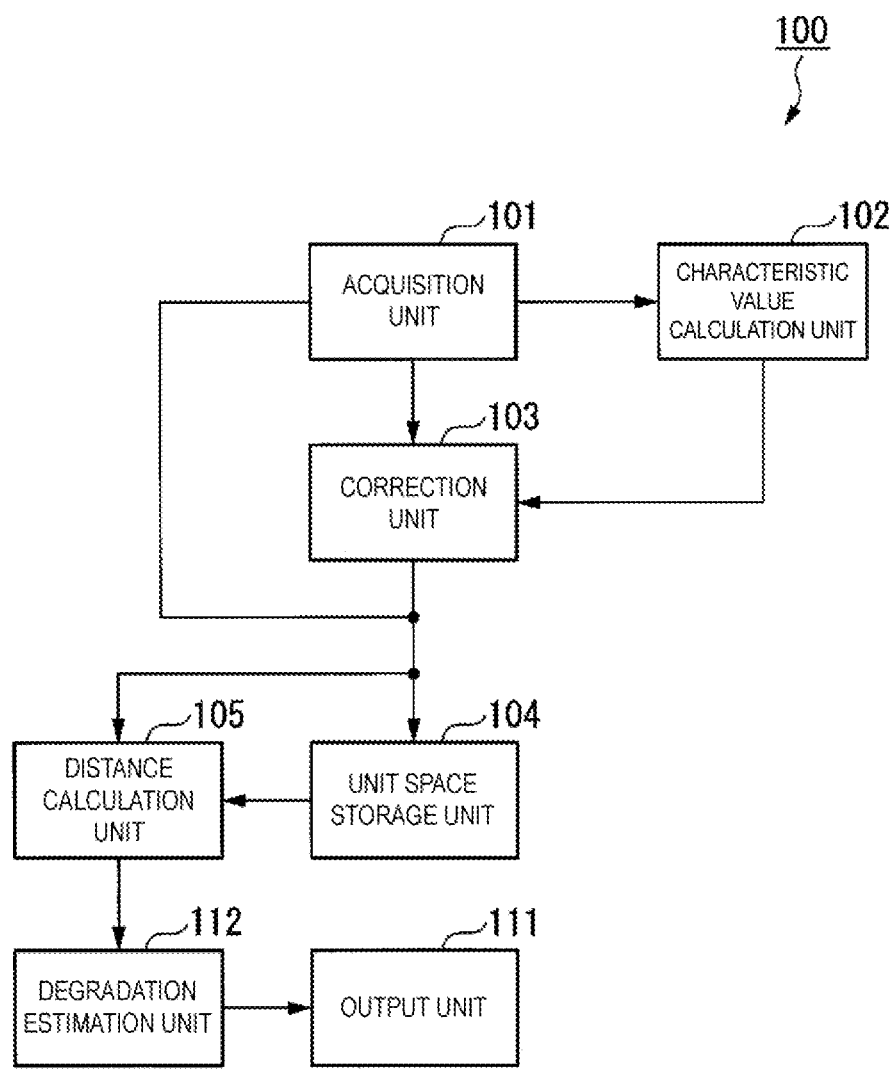
FIG. 4 is a schematic block diagram for illustrating the configuration of a monitoring device according to a second embodiment of the present invention.

Description is given of the configuration of the monitoring device 100 according to the second embodiment. FIG. 4 is a schematic block diagram for illustrating the configuration of the monitoring device according to the second embodiment.

The monitoring device 100 according to the second embodiment includes the abnormality determination unit 106, the SN ratio calculation unit 107, the likelihood calculation unit 108, the table storage unit 109, which are the same as those in the first embodiment, and a degradation estimation unit 112 in place of the estimation unit 110.

The degradation estimation unit 112 estimate a degree of degradation based on the Mahalanobis distance calculated by the distance calculation unit 105. Specifically, the degradation estimation unit 112 estimates that the degradation advances more as the Mahalanobis distance becomes larger. For example, the degradation estimation unit 112 estimates that degradation is "absent" when the Mahalanobis distance is smaller than 1.5. The degradation estimation unit 112 estimates that degradation is "small" when the Mahalanobis distance is equal to and greater than 1.5 and smaller than 2.5. The degradation estimation unit 112 estimates that degradation is "medium" when the Mahalanobis distance is equal to and greater than 2.5 and smaller than 3.5. The degradation estimation unit 112 estimates that degradation is "large" when the Mahalanobis distance is equal to and greater than 3.5.

As the unit space of the Mahalanobis distance, the unit space storage unit 104 in the second embodiment stores the combinations of the correction measurement value and the command values of the gas turbine T, which are acquired during the start-up period of the gas turbine T in a new article state (for example, during the period of two weeks from the operation start time point of the gas turbine T in a new article state).

Method for Monitoring Gas Turbine

Figure 5:
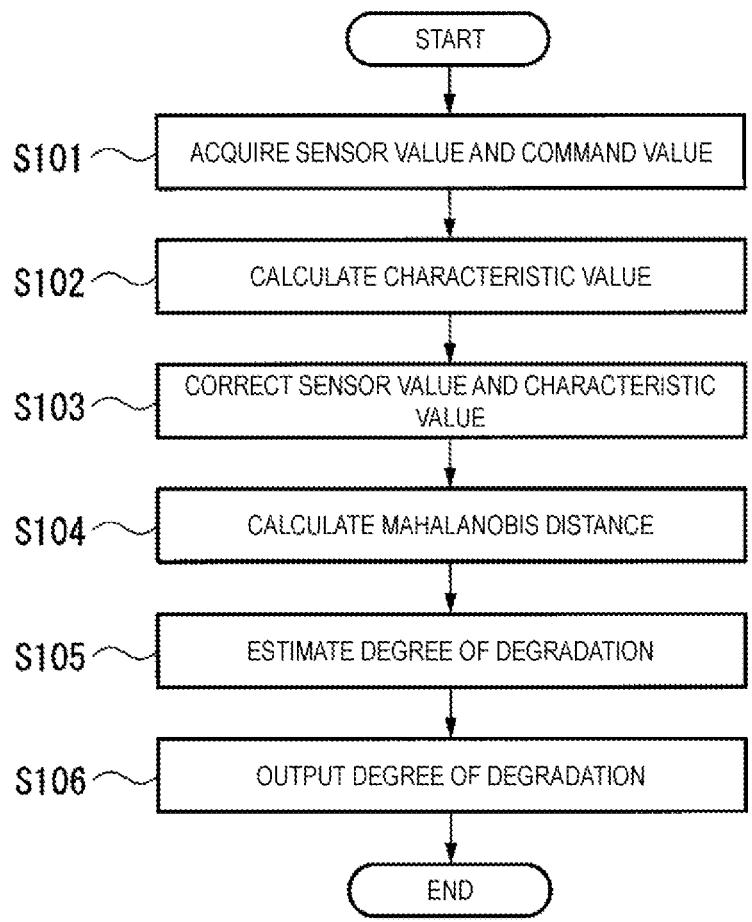
FIG. 5 is a flowchart for illustrating operations of the monitoring device according to the second embodiment.

Next, description is given of a method for monitoring the gas turbine, which is performed by the monitoring device 100. FIG. 5 is a flowchart for illustrating the operations of the monitoring device according to the second embodiment.

During the start-up period of the gas turbine T in a new article state, the monitoring device 100 collects the state quantities of the gas turbine T, and causes the unit space storage unit 104 to store the combinations of the state quantities. That is, the monitoring device 100 associates the command values of the gas turbine acquired by the acquisition unit 101 and the correction measurement value formed by the correction unit 103, and records the values in the unit space storage unit 104. The monitoring device 100 performs monitoring operations as described below at a timing during a predetermined period (for example, for two weeks) starting from the operation start time point of the gas turbine T after the completion of the regular inspection.

When the monitoring device 100 starts monitoring, the acquisition unit 101 acquires the sensor values acquired by the sensors provided to the gas turbine T and the command values of the gas turbine T (Step S101). Subsequently, the characteristic value calculation unit 102 calculates the characteristic values of the gas turbine T based on the sensor values acquired by the acquisition unit 101 (Step S102). Subsequently, the correction unit 103 corrects the sensor values and the characteristic values based on the thermal equilibrium calculations of the gas turbine T, and obtains the correction measurement value (Step S103).

Subsequently, the distance calculation unit 105 calculates the Mahalanobis distance based on the unit space stored by the unit space storage unit 104 with the factors of the command values acquired in Step S101 and the correction measurement value obtained in Step S103 (Step S104). Subsequently, the degradation estimation unit 112 estimates the degree of degradation based on the calculated Mahalanobis distance (Step S 105). Then, the output unit 111 outputs the degree of degradation estimated by the degradation estimation unit 112 (Step S106).

Operational Effects

As described above, according to the second embodiment, the monitoring device 100 calculates the Mahalanobis distance with the state quantities during the start-up period starting from the operation start time point of the gas turbine T in a new article state as the unit space and with the factors of the state quantities after the operation start time point of the gas turbine T after the regular inspection. With this, the monitoring device 100 can estimate the degree of degradation of the gas turbine T restored through the regular inspection by making a comparison with the new article state.

Note that, the unit space storage unit 104 in the second embodiment stores the state quantities acquired during the start-up period of the gas turbine T in a new article state as the unit space of the Mahalanobis distance, but is not limited thereto. For example, the unit space storage unit 104 in the other embodiments may store performance prediction values obtained by a simulation using a physical model of the gas turbine T as the unit space of the Mahalanobis distance.

Third Embodiment

Now, with reference to the drawings, detailed description is given of a third embodiment of the present invention.

The monitoring device 100 according to the third embodiment calculates the Mahalanobis distance by normalizing the correction measurement value formed by the correction unit 103 based on atmospheric conditions.

Figure 6:
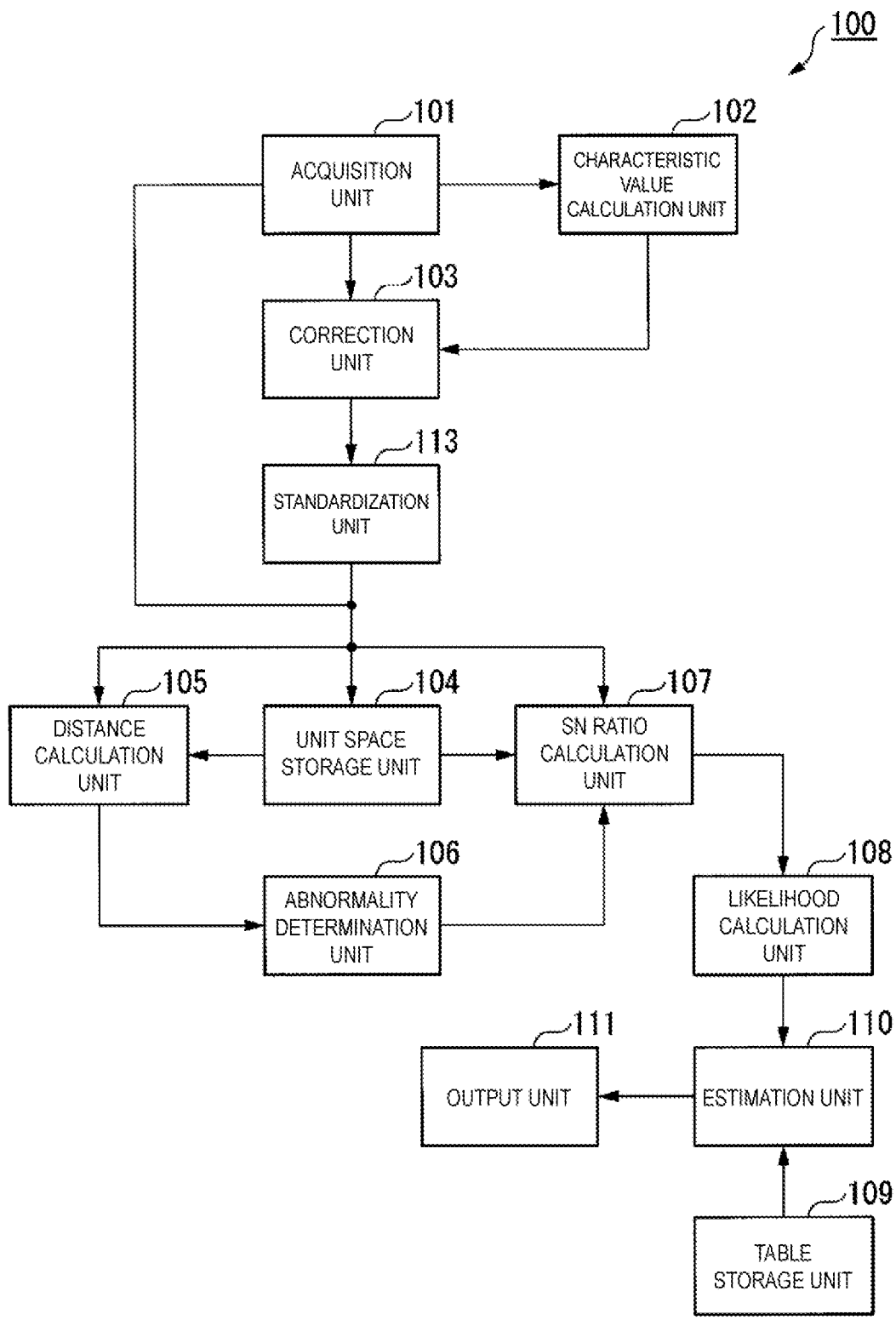
FIG. 6 is a schematic block diagram for illustrating the configuration of a monitoring device according to a third embodiment of the present invention.

Description is given of the configuration of the monitoring device 100 according to the third embodiment. FIG. 6 is a schematic block diagram for illustrating the configuration of the monitoring device according to the third embodiment.

The monitoring device 100 according to the third embodiment further includes a normalization unit 113 in addition to the configuration in the first embodiment.

The normalization unit 113 normalizes the correction measurement value formed by the correction unit 103 into values corresponding to the normal atmospheric conditions by using the atmospheric conditions (atmospheric pressure, atmospheric temperature, atmospheric humidity, and the like) among the sensor values acquired by the acquisition unit 101. That is, the acquisition unit 101 is an example of an atmospheric condition acquisition unit for acquiring the atmospheric conditions. As the correction measurement value being a subject to be normalized, there are exemplified output electric power, heat consumption rate, exhaust air flow rate, intake air flow rate, exhaust air energy, and exhaust air temperature.

Specifically, the normalization unit 113 stores functions indicating relationships between the atmospheric conditions and the coefficients (normalization coefficients) for the normalization in advance, and substitutes the atmospheric conditions in the functions. In this manner, the normalization specifies the normalization coefficients for the normal atmospheric conditions. Subsequently, the normalization unit 113 specifies the correction measurement value that is normalized by multiplying the correction measurement value by the normalization coefficients.

Figure 7:
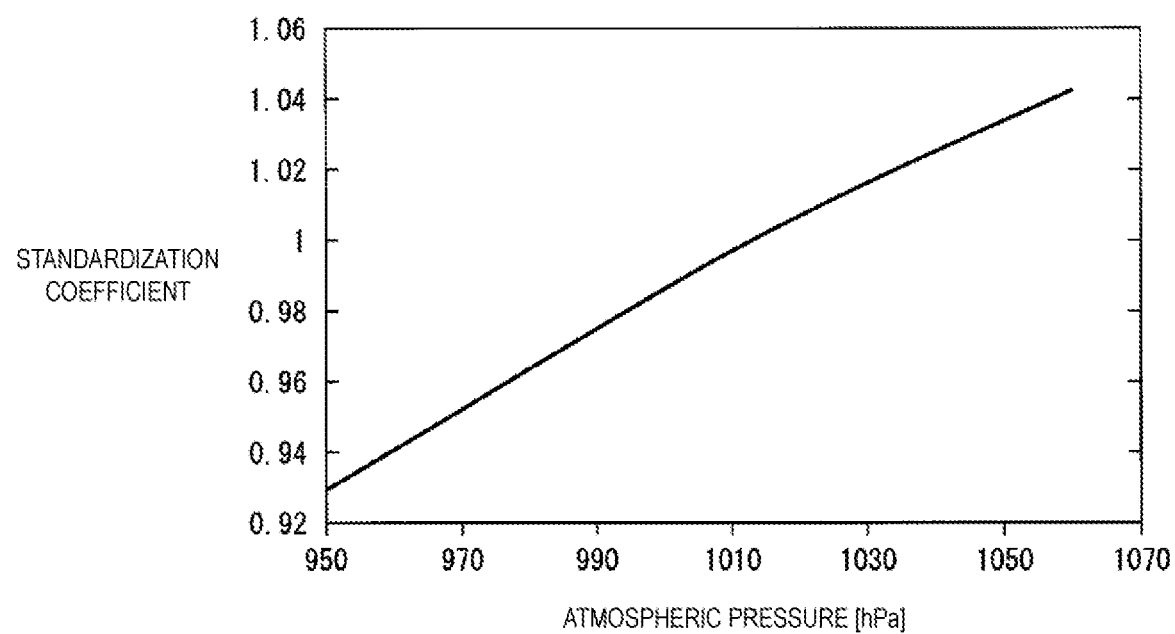
FIG. 7 is a graph for showing an example of a function, which expresses a relationship between an atmospheric condition and a standardization coefficient.

Here, description is given of an example of a method for obtaining the functions indicating the relationships between the atmospheric conditions and the normalization coefficients. The measurement values are calculated in advance by changing the variables for the atmospheric conditions in predetermined domains through use of the physical model of the gas turbine T. In this manner, curves indicating the relationships between the variables and the normalization coefficients can be obtained. Further, variable function expressions are formed for the normalization coefficients depending on the plurality of variables for the atmospheric conditions. In this case, the expression indicating the relationship between the variable and the normalization coefficient is obtained for each variable by changing the variables for the atmospheric conditions one by one. The domains of the functions indicating the relationships between the atmospheric conditions and the normalization coefficients in the third embodiment are ranges estimated based on the normal state or designated reference conditions of the gas turbine T. FIG. 7 is a graph for showing an example of a function indicating a relationship between the atmospheric condition and the normalization coefficient. With the above-mentioned procedure, the functions indicating the atmospheric conditions and the normalization coefficients as shown in FIG. 7 can be obtained.

The distance calculation unit 105 in the third embodiment calculates the Mahalanobis distance with the factors of the command values acquired by the acquisition unit 101 and the correction measurement value normalized by the normalization unit 113. In this manner, according to the thirdnd embodiment, the unit space of the Mahalanobis distance can be simplified by normalizing the correction measurement value with the atmospheric conditions. Accordingly, the abnormality determination performed by the abnormality determination unit 106 can be improved in accuracy. For example, a relationship between the atmospheric pressure and the flow rate is non-linear. Thus, the normalization unit 113 normalizes the flow rate with the condition of the normal atmospheric pressure so that the linearity of the Mahalanobis distance can be improved.

Note that, the normalization unit 113 in the third embodiment normalizes the correction measurement value by which the correction unit 103 performs the correction, but is not limited thereto. For example, the normalization unit 113 in the other embodiments may normalize the sensor values acquired by the acquisition unit 101 to the values indicating the atmospheric conditions. In this case, the characteristic value calculation unit 102 calculates the characteristic values using the sensor values that are normalized, and the correction unit 103 calculates the correction measurement value using the sensor values that are normalized and the characteristic values.

Further, the normalization unit 113 in the other embodiments may normalize the correction measurement value or the measurement values using any one or two of the atmospheric pressure, the atmospheric temperature, and the atmospheric humidity.

Note that, in the other embodiments, similarly to the second embodiment, the monitoring device 100, which includes the abnormality determination unit 106, the SN ratio calculation unit 107, the likelihood calculation unit 108, the table storage unit 109, and the degradation estimation unit 112 in place of the estimation unit 110, may further include the normalization unit 113.

Fourth Embodiment

Now, with reference to the drawing, detailed description is given of a fourth embodiment of the present invention.

The monitoring device 100 according to the fourth embodiment determines whether the Mahalanobis distance is calculated based on the measurement values.

Figure 8:
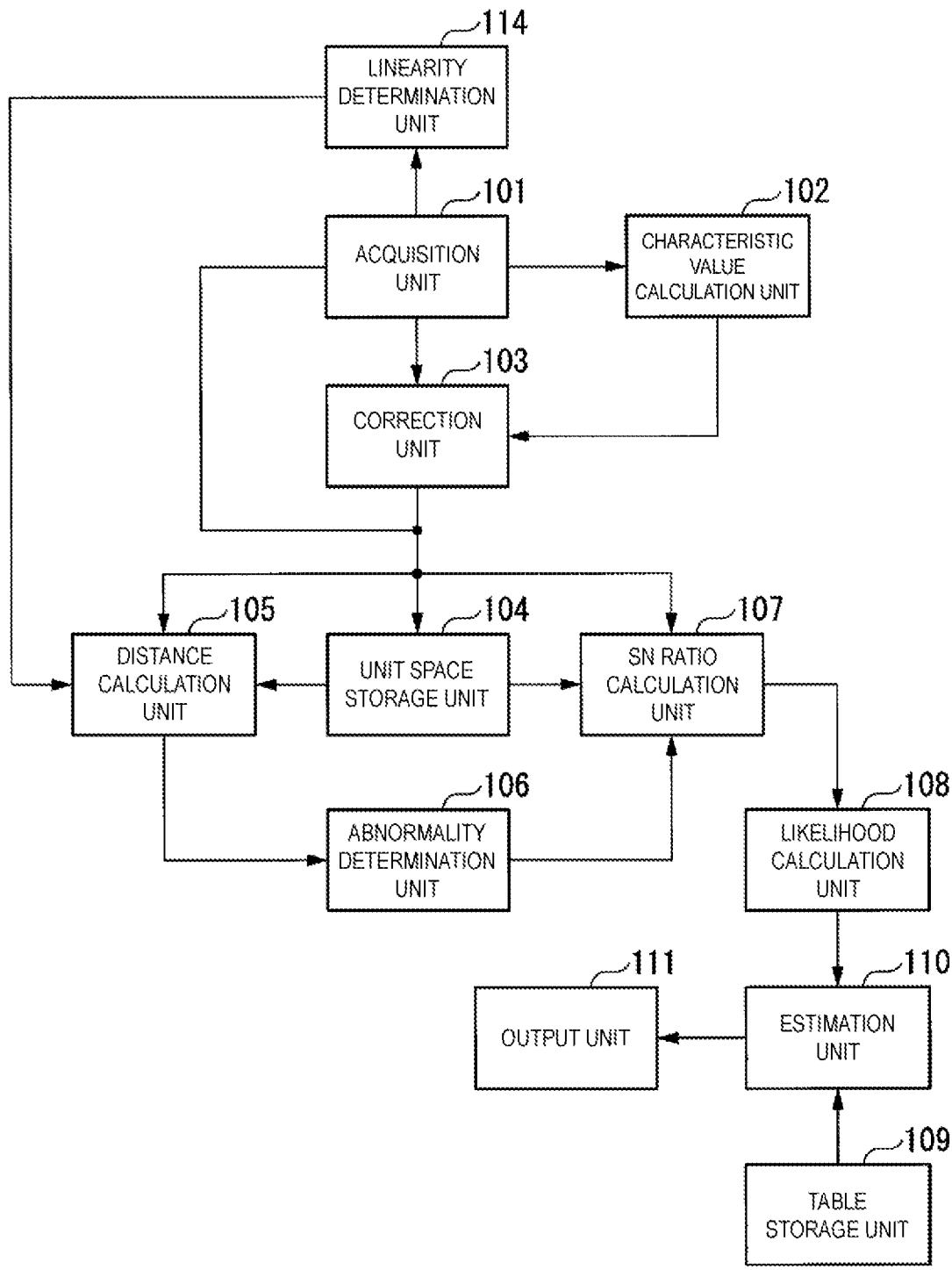
FIG. 8 is a schematic block diagram for illustrating the configuration of a monitoring device according to a fourth embodiment of the present invention.

Description is given of the configuration of the monitoring device 100 according to the fourth embodiment. FIG. 8 is a schematic block diagram for illustrating the configuration of the monitoring device according to the fourth embodiment.

The monitoring device 100 according to the fourth embodiment further includes a linearity determination unit 114 in addition to the configuration in the first embodiment.

As for a sensor value T indicating the temperature among the sensor values acquired by the acquisition unit 101, the linearity determination unit 114 determines whether the sensor value T falls within a range from the minimum value of the sensor value T to the maximum value of the sensor value T that are stored by the unit space storage unit 104. In this manner, when the Mahalanobis distance is calculated based on the sensor value that is acquired, the linearity determination unit 114 determines whether the linearity in the relationship between the temperature and the output is kept in the unit space of the Mahalanobis distance.

When the linearity determination unit 114 determines that the sensor value falls within the range of the sensor value stored in the unit space storage unit 104, the distance calculation unit 105 calculates the Mahalanobis distance based on the sensor value. In contrast, when the linearity determination unit 114 determines that the sensor value is not within the range of the sensor value stored in the unit space storage unit 104, the distance calculation unit 105 does not calculate the Mahalanobis distance, but calculates the Mahalanobis distance later on (for example, after elapse of a predetermined time).

In this manner, when the linearity in the relationship between the temperature and the output is less likely to be kept, the monitoring device 100 according to the fourth embodiment does not calculate the Mahalanobis distance.

Accordingly, an erroneous determination by the abnormality determination unit 106 can be prevented.

Note that, in the other embodiments, similarly to the second embodiment, the monitoring device 100, which includes the abnormality determination unit 106, the SN ratio calculation unit 107, the likelihood calculation unit 108, the table storage unit 109, and the degradation estimation unit 112 in place of the estimation unit 110, may further include the linearity determination unit 114.

With reference to the drawings, detailed description is given of the embodiment above. However, the specific configuration is not limited to the one described above, and various design changes and the like can be made.

For example, the subject device in the above-mentioned embodiments is the gas turbine T, but is not limited in the other embodiments. For example, the subject device in the other embodiments may be a steam turbine, an engine, and other devices having thermal input and output.

Figure 9:
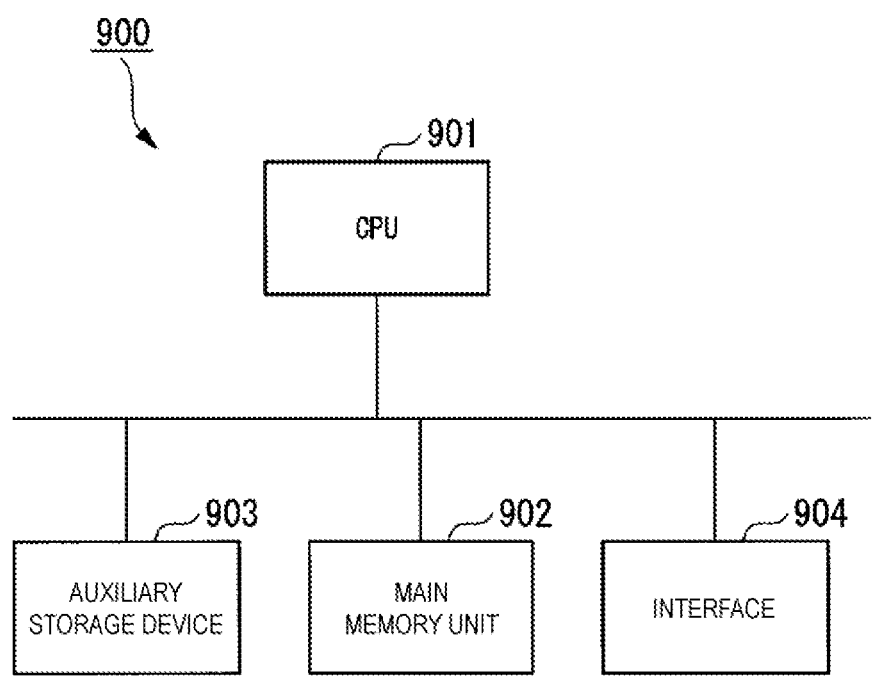
FIG. 9 is a schematic block diagram for illustrating the configuration of a computer in at least one embodiment.

FIG. 9 is a schematic block diagram for illustrating the configuration of a computer in at least one of the embodiments.

A computer 900 includes a CPU 901, a main storage device 902, an auxiliary storage device 903, and an interface 904.

The monitoring device 100 described above includes the computer 900. Further, the operations of the respective processing units described above are stored in a form of a program in the auxiliary storage device 903. The CPU 901 reads the program from the auxiliary storage device 903, develops the program to the main storage device 902, and executes the above-mentioned processing in accordance with the program. Further, the CPU 901 secures storage areas corresponding to the respective storage units described above in the main storage device 902 in accordance with the program.

Note that, in at least one of the embodiments, the auxiliary storage device 903 is an example of a non-temporary concrete medium. As other non-temporary concrete mediums, for example, there are exemplified a magnetic disk, a magneto-optic disk, a laser disk, and a semiconductor memory, which are to be connected through the interface 904. Further, when this program is distributed to the computer 900 through a communication line, the computer 900 receiving the distribution may develop the program to the main storage device 902, and may execute the above-mentioned processing.

Further, the program may achieve some of the functions described above.

In addition, the program may achieve the functions described above in combination with other programs already stored in the auxiliary storage device 903, that is, may be differential files (differential programs).

INDUSTRIAL APPLICABILITY

According to at least one mode of the above-mentioned modes, the monitoring device performs the thermal equilibrium calculations and the correction for the measurement values, thereby being capable of suppressing an error included in the measurement values. With this, the monitoring device can calculate the Mahalanobis distance while suppressing the influence of the error included in the measurement values.

Reference Signs List

100 Monitoring device
101 Acquisition unit
102 Characteristic value calculation unit
103 Correction unit
104 Unit space storage unit
105 Distance calculation unit
106 Abnormality determination unit
107 SN ratio calculation unit
108 Likelihood calculation unit
109 Table storage unit
110 Estimation unit
111 Output unit
112 Degradation estimation unit
T Gas turbine

The invention claimed is:

1. A monitoring device, comprising:
a processor; a memory; and a program in the memory for causing the processor to function as:
an acquisition unit configured to acquire measurement values being measurement values of a target device, the measurement values including at least a temperature and a flow rate of an input fluid to be input to the target device, and a temperature and a flow rate of an output fluid to be output from the target device;
a correction unit configured to acquire correction measurement values by substituting the measurement values to a plurality of thermal equilibrium calculations, calculating combinations of errors for the measurement values, which satisfy the plurality of thermal equilibrium calculations respectively, calculating a total of the errors or a total of squares of the errors for each combination, and selecting the combination so as to obtain the smallest total; and
a distance calculation unit configured to calculate a Mahalanobis distance with a factor of the correction measurement values.

2. The monitoring device according to claim 1, the program in the memory for causing the processor to further function as:
an atmospheric condition acquisition unit configured to acquire an atmospheric condition including at least one of an atmospheric pressure, an atmospheric temperature, and an atmospheric humidity; and
a normalization unit configured to normalize the correction measurement values to values under a normal atmospheric condition by using the atmospheric condition that is acquired,
wherein the distance calculation unit calculates the Mahalanobis distance based on the normalized correction measurement values.

3. The monitoring device according to claim 1, the program in the memory for causing the processor to further function as:
a likelihood calculation unit configured to calculate an occurrence likelihood for each of a plurality of phenomena that are liable to occur to the target device based on the correction measurement values when the Mahalanobis distance is equal to or greater than a predetermined value;
a table storage unit configured to store a table in which the plurality of phenomena and occurrence causes of abnormalities of the target device are associated to each other; and
an estimation unit configured to estimate the occurrence causes based on the occurrence likelihood and the table.

4. The monitoring device according to claim 1, the program in the memory for causing the processor to further function as:

a linearity determination unit configured to determine whether a measurement value indicating a temperature among the measurement values acquired by the acquisition unit falls within a range from a minimum value to a maximum value of a measurement value indicating a temperature, which forms a unit space of the Mahalanobis distance, wherein the distance calculation unit is prevented from calculating the Mahalanobis distance based on the correction measurement values when the linearity determination unit determined that the measurement value is out of the range from the minimum value to the maximum value of the measurement value indicating the temperature in the unit space.

5. The monitoring device according to claim 1, wherein the acquisition unit acquires the measurement values at a time point after a start-up, which is a time point after elapse of a predetermined start-up period starting from an operation start time point of the target device, and the distance calculation unit calculates the Mahalanobis distance based on the correction measurement values acquired by the correction unit with the unit space formed by using measurement values at a time point during the predetermined start-up period.

6. A method for monitoring a target device, comprising following steps of:

acquiring measurement values being measurement values of a target device, the measurement values including at least a temperature and a flow rate of an input fluid to be input to the target device, and a temperature and a flow rate of an output fluid to be output from the target device;

acquiring correction measurement values by substituting the measurement values to a plurality of thermal equilibrium calculations, calculating combinations of errors for the measurement values, which satisfy the plurality of thermal equilibrium calculations respectively, calculating a total of the errors or a total of squares of the errors for each combination, and selecting the combination so as to obtain the smallest total; and calculating a Mahalanobis distance with a factor of the correction measurement values.

7. The method for monitoring a target device according to claim 6, further comprising following steps of:

acquiring an atmospheric condition including at least one of an atmospheric pressure and an atmospheric humidity; and normalizing the correction measurement values to values under a normal atmospheric condition by using the atmospheric condition that is acquired, wherein the Mahalanobis distance is calculated based on the normalized correction measurement values.

8. A non-transitory computer-readable storage medium storing a program, which causes a computer to execute the processing of:

acquiring measurement values being measurement values of a target device, the measurement values including at least a temperature and a flow rate of an input fluid to be input to the target device, and a temperature and a flow rate of an output fluid to be output from the target device;

acquiring correction measurement values by substituting the measurement values to a plurality of thermal equilibrium calculations, calculating combinations of errors for the measurement values, which satisfy the plurality of thermal equilibrium calculations respectively, calculating a total of the errors or a total of squares of the errors for each combination, and selecting the combination so as to obtain the smallest; and calculating a Mahalanobis distance with a factor of the correction measurement values.

* * * * *